(12) United States Patent
Parks

(10) Patent No.: US 8,869,446 B2
(45) Date of Patent: Oct. 28, 2014

(54) FISHING LURE WITH SPLIT BRUSH GUARD

(76) Inventor: Steve Parks, Burleson, TX (US)

( * ) Notice: Subject to any disclaimer, the term of this patent is extended or adjusted under 35 U.S.C. 154(b) by 166 days.

(21) Appl. No.: 13/396,317

(22) Filed: Feb. 14, 2012

(65) Prior Publication Data

US 2013/0205642 A1   Aug. 15, 2013

(51) Int. Cl.
*A01K 85/02* (2006.01)
(52) U.S. Cl.
USPC ........... 43/42.4; 43/42.28; 43/42.37; 43/43.2; 43/42.39
(58) Field of Classification Search
USPC .............. 43/42.39, 42.28, 42.24, 42.37, 42.4, 43/42.41, 43.2, 43.6
IPC ............................................. A01K 85/00,85/02
See application file for complete search history.

(56) References Cited

U.S. PATENT DOCUMENTS

| | | | | |
|---|---|---|---|---|
| 2,165,734 | A * | 7/1939 | Stracener | 43/42.27 |
| 2,255,222 | A | 4/1940 | Leusch | |
| 2,789,387 | A | 9/1956 | Plummer, Jr. | |
| 3,221,437 | A | 12/1965 | De Long | |
| 3,497,988 | A | 3/1970 | Childers | |
| 3,662,485 | A * | 5/1972 | Klemkowski, Jr. | 43/42.34 |
| 4,432,157 | A * | 2/1984 | Gowing | 43/42.31 |
| 4,777,758 | A | 10/1988 | Phillips | |
| 4,790,100 | A | 12/1988 | Green, Sr. | |
| 4,908,975 | A * | 3/1990 | Root et al. | 43/42.25 |
| 5,117,573 | A * | 6/1992 | Semler | 43/42.28 |
| 5,491,927 | A * | 2/1996 | Ortiz | 43/42.28 |
| 5,524,377 | A | 6/1996 | Freeman et al. | |
| 5,983,554 | A | 11/1999 | Storey | |
| 6,032,400 | A * | 3/2000 | Lau | 43/42 |
| 6,598,336 | B2 * | 7/2003 | Link | 43/42.28 |
| 6,601,336 | B1 | 8/2003 | Link | |
| D515,657 | S | 2/2006 | Ljungstrom | |
| 7,694,453 | B1 | 4/2010 | Arrico | |
| D637,687 | S | 5/2011 | Jarboe, Jr. | |
| D637,688 | S | 5/2011 | Norton et al. | |
| D648,415 | S | 11/2011 | Jarboe, Jr. et al. | |
| 2005/0183323 | A1 * | 8/2005 | Harrell | 43/42.39 |
| 2008/0236022 | A1 | 10/2008 | Harrell | |

OTHER PUBLICATIONS

Perfect Strike Tackle, Alpha Jigs-Black, Blue & Purple Punch, www.perfectstriketackle.com, 4 web pages, Feb. 15, 2012.

* cited by examiner

*Primary Examiner* — Darren W Ark
*Assistant Examiner* — Lisa Tsang
(74) *Attorney, Agent, or Firm* — Geoffrey A. Mantooth

(57) ABSTRACT

A fishing lure has a body and a hook. The hook has a shank that extends from the body, a bend and a point. The hook is lying in a hook plane. A brush guard has bristles that extend from the head to a blocking position in front of the hook point. The bristles are spread apart to either side of the hook plane. An elastomeric band around the lure body retains the bristles in a spread apart configuration. The spread apart bristles create a laterally wider brush guard so as to prevent snagging of the hook point no matter what the orientation of the lure in the water might be.

11 Claims, 2 Drawing Sheets

FISHING LURE WITH SPLIT BRUSH GUARD

FIELD OF THE INVENTION

The present invention relates to fishing lures, and in particular to fishing lures equipped with a brush, or a weed, guard.

BACKGROUND OF THE INVENTION

Fishing lures come in all shapes and sizes. One type of fishing lure is a jig head, which has a head and a hook extending from the aft end of the head. The shank of the hook trails back of the head, while the bend of the hook curves up and the point points forward in the general direction of the head. The jig head can be outfitted with a variety of accessories, such as streamers, slabs, other lures, etc.

When the jig head is retrieved, the hook points forward in the direction of retrieve. Consequently, the hook tends to become snagged on objects, such as submerged brush, branches, etc. In fishing, many fish are found among underwater structures such as brushy areas, raising the possibility of the lure and its hook becoming snagged.

In the prior art, lures have been equipped with one or more wires or bristles that extend from the lure head rearwardly toward the point of the hook. These wires or bristles form brush or weed guards. These brush or weed guards work well if the jig is retrieved in an upright configuration. However, if the hook lays over on its side, as it commonly does on retrieve, it can become snagged on an underwater object. For example, the fishing line attached to the lure may run over a tree limb or a brush limb. When the fishing rod is pulled to retrieve the lure, as it is pulled over the limb, the lure lays over on its side wherein the hook snags the limb.

In the prior art, fishermen have to spread the brush guard laterally, usually by inserting a finger or a tool. However, once spread, the brush guard bristles return to their unsplit configuration once the finger or tool is removed. Some fishermen put some glue to hold the bristles apart. However, this is time consuming and does not always hold.

DESCRIPTION OF THE PREFERRED EMBODIMENT

Figure 1:
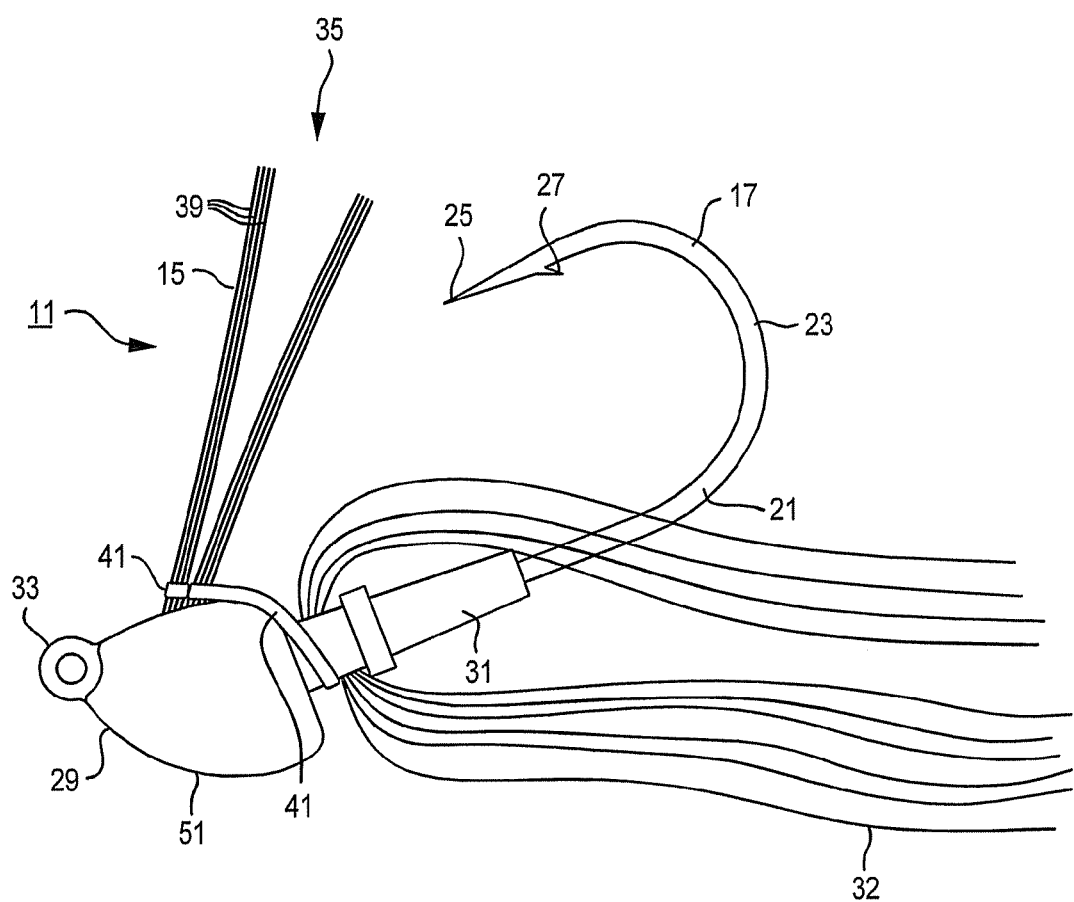
FIG. 1 is a front perspective view of a fishing lure with a split brush guard.

FIG. 1 shows a fishing lure 11 in accordance with a preferred embodiment. The lure is provided with a brush guard 15 that seeks to minimize the snagging of the hook 17 on underwater objects. Brush guards are known in the prior art, as shown by U.S. Pat. No. 5,524,377 and Publication No. 2008/0236022, the entire disclosures of which are incorporated herein by reference.

The brush guard 15 is split into a "V" type configuration to provide some lateral width to the brush guard. This arrangement prevents the hook 17 from snagging, no matter what the orientation of the hook might be on retrieve.

In the description that follows, the orientation of FIG. 1 is used, with "front" being to the left of the lure and "rear" or "aft" being to the right of the lure. The lure is retrieved in a right to left fashion that is to the front.

The particular fishing lure 11 shown is a jig head. The jig head has a hook 17, which hook has a shank 21, a bend 23 and a point 25. Near the point 25 is a barb 27. The shank 21, bend 23 and point 25 lie in a plane P (see for example FIG. 3).

The end of the shank 21 which is opposite to the bend 23 is coupled to a body or head 29. The head has a coupling portion 31 where the shank joins to the head. The coupling portion 31 encompasses part of the shank 21. The coupling portion 31 may have a groove, a barb, etc. for attaching other devices such as streamers 32 (only a few of which are shown), plastic lures, etc. The hook 17 extends aft of the head. The head 29 is weighted and made of metal such as steel or lead. The head 29 has an eyelet 33 generally opposite of the hook shank 21 and located on the front or forward end of the head.

A brush guard 15 is provided. The brush guard is made up of plural bristles 39 that extend from the jig head 29 to a blocking position 35 relative to the point 25. The blocking position is in front of the point 25; as the lure is retrieved, if a submerged object is encountered, such as a tree limb, then the brush guard contacts the limb before the point. The brush guard blocks the point from engaging or snagging the limb and causes the point to move around the limb. The exact location of the blocking position 35 can vary according to the individual taste of a fisherman. Some may wish the blocking position to be relatively far from the point so as to not to interfere with the hook setting of the fish, while others may wish the blocking position to be closer to, if not in contact with, the point. The bristles 39 can extend above the point 25.

The brush guard 15 is made up of two or more bristles. The bristles can vary in number and fineness, depending on the lure. There are at least two bristles and can be 20 to 30 bristles or more. The bristles can be coarse, fine, wiry, etc. In the preferred embodiment, the bristles are plastic and have resiliency so that if they are deformed, they will resume their original position when the deforming force or pressure is removed. For example, if the bristles are split into two groups so as to form a "V" as shown in FIG. 1, the bristles will generally close back together when the splitting force is removed.

The brush guard bristles 39 are coupled to the head 29. A hole is made in the head and one end of the bristles is located therein and secured with glue.

As mentioned, the fishing lure can be provided with other items as well, such as streamers and/or a slab. The streamers 32 are coupled to the coupling portion in a conventional manner such as by way of a rubber band. The streamers 32 are different from the brush guard bristles 39. While the brush guard bristles are stiff and retain their position no matter the orientation of the lure, the streamers are very flexible and point down no matter what the orientation of the lure is. Upon retrieving the lure in water, the streamers point to the rear of the lure, while the brush guard bristles 39 generally maintain their blocking position in front of the point 25.

Figure 2:
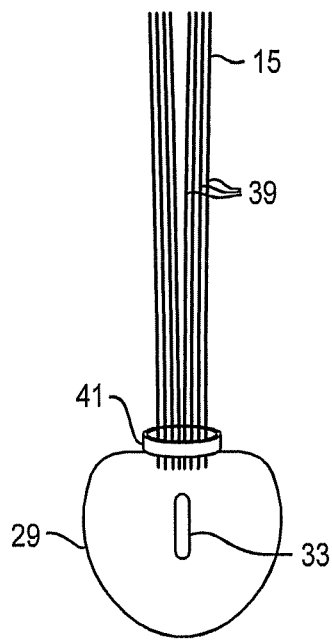
FIG. 2 is an upper front end view of the lure of FIG. 1 shown with a band around the brush guard.
Figure 3:
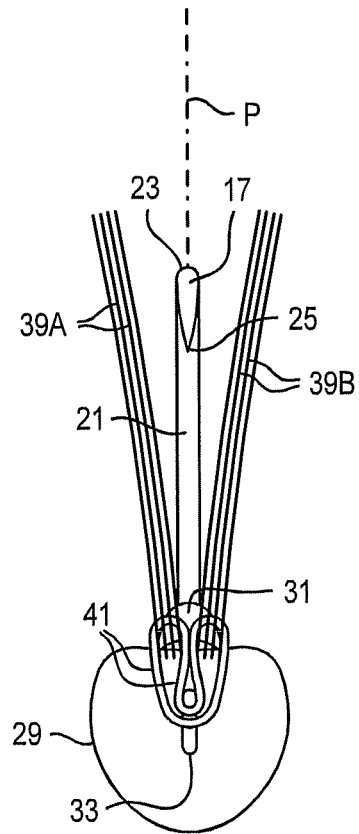
FIG. 3 is an upper front end view of the lure, showing the brush guard bristles split apart and the band stretched in the process of securing it.

In the unspread configuration, where the bristles are in one group, the bristles generally lie in the hook plane P. This is illustrated in FIG. 2, where in the front end view, the bristles obscure the view of the hook located aft. The brush guard bristles can be manually spread apart to extend laterally of the hook plane, as shown in FIGS. 1 and 3. However without some type of spreader, the bristles will close back together again.

In the preferred embodiment, the spreader is an elastic band 41, such as a rubber band. The spreader band 41 can be installed in a number of different ways. To install the spreader in accordance with a preferred embodiment, the band 41 is placed around all of the bristles 39 of the brush guard 15 and located near the jig head 29 (see FIG. 2). Then, as shown in FIG. 3, the bristles 39 are spread apart into two groups or sets, 39A, 39B, with one group extending over one side of the hook plane P and the other group extending to the opposite side. Then, the center portions of the band 41, which are located in the gap between the two bristle groups, are pulled forward toward the eyelet 33 and then over the eyelet to a location under, or on the bottom, 51 of the head 51. The band thus encircles the head (except for the gap between the bristle groups). To prevent the band 41 from slipping off of the head, the band is moved aft to a location where the coupling portion 31 joins the head 29.

Figure 4:
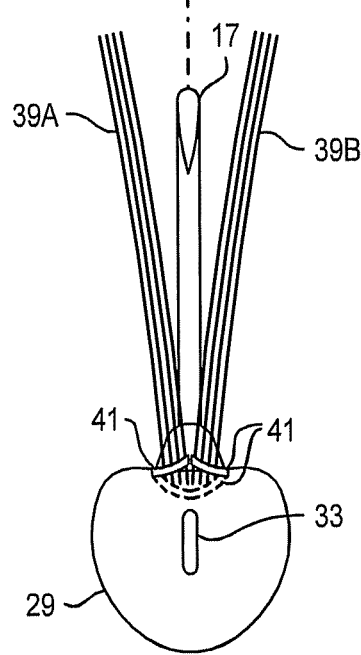
FIG. 4 is an upper front end view of the lure, showing the band secured in place and the brush guard secured in a split.

The band 41 pulls the two groups 39A, 39B of bristles apart and keeps them apart. The direction of pull is away from the hook plane P so that the two groups of bristles form a "V" when the lure is viewed from the front (eyelet) end (as shown in FIG. 4).

The band 41 need not pull the bristles wholly or entirely perpendicular to the hook plane P. Rather, the band need only have a component of its pulling force perpendicular to the hook plane. For example, with the jig head shown, the composite pulling force is about 45-60 degrees from the perpendicular to the hook plane. The band pulls not only perpendicular to the hook plane P, but also pulls aft. Yet, the perpendicular force is sufficient so as to maintain the bristles in their spread configuration.

If there are only two bristles, then after dividing into two groups or sets, each group or set has only a single bristle.

To return the brush guard to its original condition, the band is cut away or removed.

The foregoing disclosure and showings made in the drawings are merely illustrative of the principles of this invention and are not to be interpreted in a limiting sense.

The invention claimed is:

1. A fishing lure, comprising:
   a) a body;
   b) a hook extending from the body and comprising a point;
   c) a brush guard having bristles extending from the body to a blocking position in front of the hook point, the bristles extending to the blocking position as the lure is retrieved through water so that if the lure contacts an obstruction, the bristles block the hook from snagging into the obstruction, the bristles spread apart into two groups; and
   d) a band coupled to a first one of the bristle groups, and extending around the body where the band is coupled to a second one of the bristle groups, the band pulling the two bristle groups apart, wherein the bristles are coupled to the body independently of the band so that when the band is removed, the bristles remain coupled to the body.

2. The fishing lure of claim 1, wherein the band is elastomeric.

3. The fishing lure of claim 2, wherein the two groups of bristles are in a "V" shape when viewed from an end of the body.

4. The fishing lure of claim 1, wherein the hook further comprises a shank and a bend, the shank, the bend and the point lying in a hook plane, the two bristle groups spread transversely apart relative to the hook plane with the hook plane located between the two bristle groups.

5. The fishing lure of claim 1, wherein when the lure is moved in water, the streamers point to a rear of the lure and are unable to maintain location in the blocking position.

6. The fishing lure of claim 1, wherein when the band is removed, the bristles move to form a single group.

7. A fishing lure, comprising:
   a) a body;
   b) a hook extending from the body and comprising a point;
   c) a brush guard having bristles, with the bristles having free ends and body ends, the body ends of the bristles coupled to the body in a single bunch; and
   d) a band spreading the bristles apart into two groups, with the band coupled to a first one of the bristle groups, and extending around the body where the band is coupled to a second one of the bristle groups, each bristle group extending to a respective blocking position in front of the hook point as the lure is retrieved through water, the bristles coupled to the body independently of the band.

8. The fishing lure of claim 7, wherein the two groups of bristles are in a "V" shape when viewed from an end of the body.

9. The fishing lure of claim 7, wherein the hook further comprises a shank and a bend, the shank, the bend and the point lying in a hook plane, the two bristle groups spread transversely apart relative to the hook plane with the hook plane located between the two bristle groups.

10. The fishing lure of claim 7, wherein when the lure is moved in water, the streamers point to a rear of the lure and are unable to maintain location in the blocking position.

11. The fishing lure of claim 7, wherein when the band is removed, the bristles move to form a single group.

\* \* \* \* \*